United States Patent [19]
Umeda

[11] 3,800,310
[45] Mar. 26, 1974

[54] ELECTRICALLY DRIVEN CAMERA MECHANISMS

[75] Inventor: Kaoru Umeda, Osaka, Japan

[73] Assignee: Minolta Camera Kabushiki Kaisha, Osaka, Japan

[22] Filed: Jan. 24, 1973

[21] Appl. No.: 326,941

[30] Foreign Application Priority Data
Jan. 25, 1972 Japan.................................. 47-8717

[52] U.S. Cl.............. 354/171, 95/31 AC, 242/71.5
[51] Int. Cl. ............................................ G03b 17/38
[58] Field of Search..... 95/31 EL, 31 AC; 242/71.5, 242/71.4, 71

[56] References Cited
UNITED STATES PATENTS
3,119,315  1/1964  Lange et al...................... 95/31 EL

*Primary Examiner*—Robert P. Greiner
*Attorney, Agent, or Firm*—Watson, Cole, Grindle & Watson

[57] ABSTRACT

A mechanism is actuated by a single shutter button to control an electrically driven camera so as to select either a manipulated or an electrically driven mode of photography. In manipulated photography the release member is actuated directly by the shutter button while in electrically driven photography a starting switch connected to an electric motor circuit is actuated by the shutter button. A differential gear mechanism is driven by the output of the electric motor in dependence upon the variation in resistance of the film winding and the contacting resistance between a cam and a switching actuating lever for controlling the motor circuit to effect film winding and shutter release.

8 Claims, 17 Drawing Figures

FIG.8A 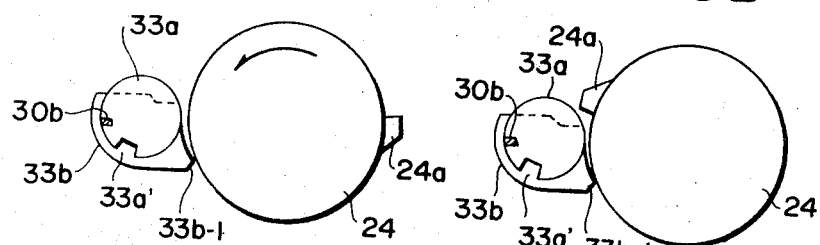 FIG.8B
FIG.8C 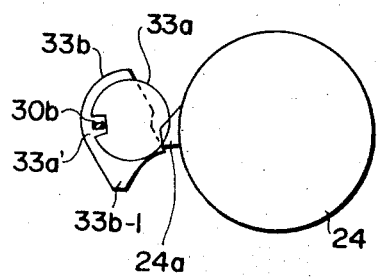 FIG.8D 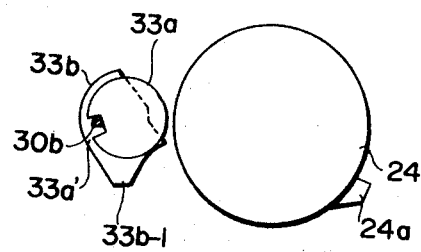
FIG.9 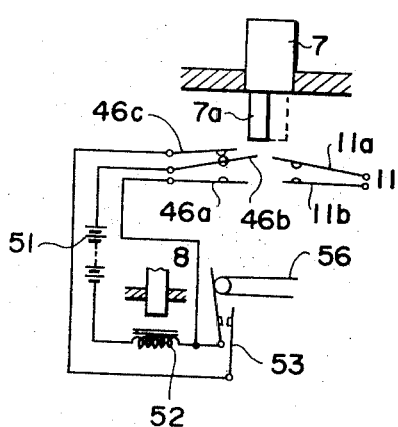 FIG.10

ELECTRICALLY DRIVEN CAMERA MECHANISMS

BACKGROUND OF THE INVENTION

This invention relates to an electrically driven camera which effects film winding and shutter release by an electric motor, and more particularly to an electrically driven camera capable of controlling, by a single shutter button, an electric motor circuit for effecting electrically driven photography and a release member for effecting manipulated photography.

Conventionally, the electrically driven camera comprises, besides the shutter button for manipulated photography, an electrically driven button mounted either at the electric motor driving means or at the section containing the power source for driving the electric motor. In the manipulated photography mode, the release member is actuated by the shutter button, and in electrically driven photography, the electrically operated button is operated to drive the electric motor, through the driving force of which the release member is operated to actuate the shutter.

With electrically driven cameras of such a type, the electrically operated shutter button mounted remotely from the position of the manipulated shutter button causes unstable photography when the electrically driven photographing is effected either by placing the camera body vertically or by laying it on its side.

THE OBJECTS OF THE INVENTION

An object of this invention is to provide an electrically driven camera which overcomes the above difficulty and which is equipped with a shutter button permitting stable electrically driven photography.

Another object of this invention is to provide an electrically driven camera permitting selective manipulated photography or electrically driven photographing by means of a single shutter button.

A further object of this invention is to provide an electrically driven camera equipped with an electric motor circuit and a differential gear for actuating a film winding member and a shutter release member by merely controlling a starting switch of the electric motor circuit.

A still further object of this invention is to provide an electrically driven camera including an electric motor circuit having a means for readily switching from one-frame photography to continuous photographing, and vice versa.

The above and other objects and features of this invention will be apparent from the following description.

SUMMARY OF THE INVENTION

In order to attain the above objects, an electrically driven camera according to this invention comprises the following components. A single shutter button common to electrically driven photography and manipulated photography. A means for switching the shutter button, a release member and a starting switch for an electric motor circuit. In manipulated photography, the release member is actuated by the shutter button, while in electrically driven photography, the starting switch is operated by the shutter button. The electric motor circuit is controlled by switch actuating levers and the starting switch. A differential gear is driven by the output of the electric motor depending upon the variation in the resistance of the film winding resistance and the contacting resistance between a cam and the switch actuating lever, thereby effecting film winding and shutter release.

BRIEF DESCRIPTION OF THE DRAWINGS

FIGS. 8A through 8D show the relationship between a cylinder, a notched disc and a plate cam each mounted on a switching shaft and a second contacting element of the switch actuating lever; and FIGS. 9, 10, 11A, 11B, 12A and 12B respectively show other details of a shutter button and the operation thereof relating to manipulated photography and electrically driven photography.

DETAILED DESCRIPTION OF THE INVENTION

Figure 1:
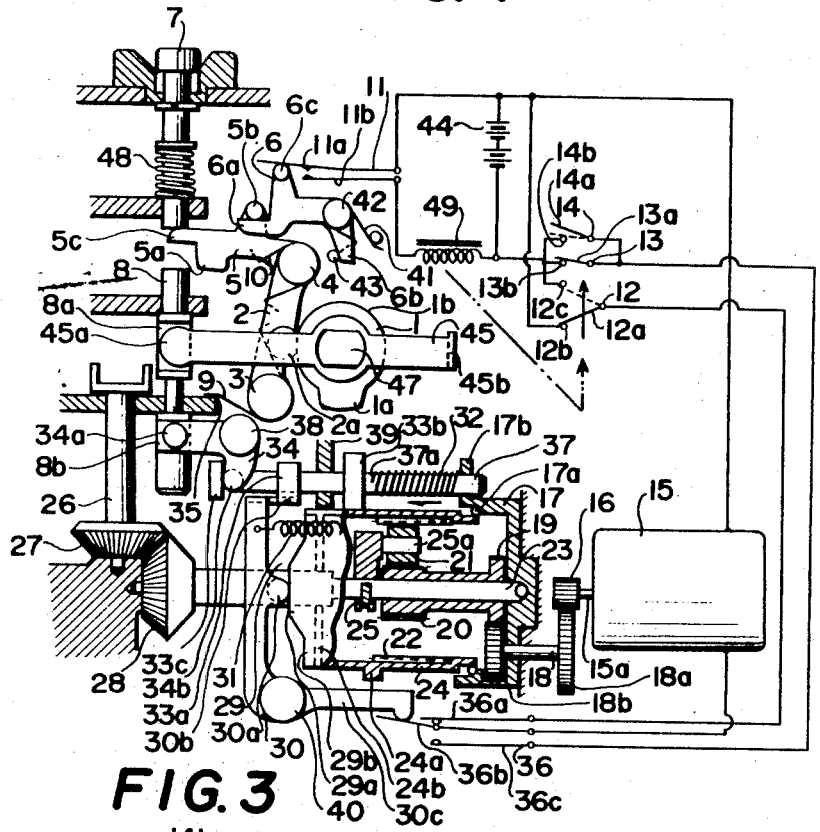
FIG. 1 is a partial longitudinal sectional side view showing a preferred embodiment according to the invention.
Figure 2:
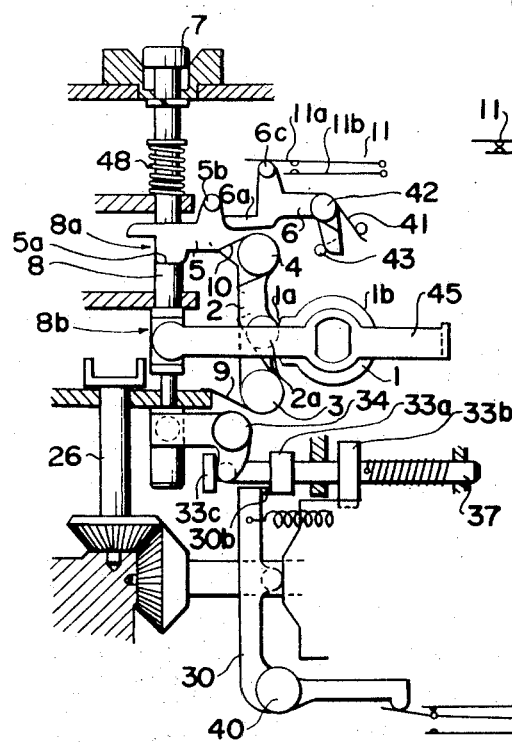
FIG. 2 is a partial side view showing an arrangement for manipulated photography according to the embodiment of FIG. 1.

Switching cam 1 is rotatable about shaft 47 and includes built-up portion 1a formed on lowered circumferential portion 1b. 2 is a lever disposed around shaft 3, so that lateral portion 2a bears against switching cam 1 by spring 9 and having one rotatable end connected to shaft 4, on which an end of switching lever 5 is journaled. Switching lever 5 has a clockwise rotating tendency by spring 10, viz., in a direction causing the other end 5c of switching lever 5 to bear against a lower end of shutter button 7. Switching lever 5 has projection 5a between the lower end of shutter button 7 and an upper end of release member 8 when switching cam 1 is switched to the position for manipulated photography (as shown in FIG. 2), and pin 5b engaging one arm 6a of first switch actuating lever 6 for operating starting switch 11. First switch actuating lever 6 is rotatable around shaft 42 and energized in the clockwise direction by a spring 41 so that the other arm 6b thereof bears against 43 attached to the body of the camera. First switch actuating lever 6 is constructed so that, in the position for manipulated photography, one arm 6a thereof is disengaged from pin 5b (as shown in FIG. 2), whereas if the shutter button is urged against lever 5, first switch actuating lever 6 is not actuated. Therefore, starting switch 11 is left non-operative. Whereas for electrically driven photography, arm 6a and pin 5b are brought into engagement (as shown in FIG. 1), and by urging the shutter button 7 downwardly, first switch actuating lever 6 is operated to close switch 11 by way of the arm 6c thereof. Accordingly, in the case of manipulated photography, when shutter button 7 is urged against switching lever 5, release lever 8 is actuated by the projected portion 5a of switching lever 5 (FIG. 2). Whereas, in the case of electrically driven photography, shutter button 7 is pushed downwardly to close starting switch 11 (FIG. 1), and release member 8 and a film winding mechanism are operated by electric motor 15 to be described later. 48 is a spring for biasing shutter button 7 normally upwardly.

In the operation of an electric mechanism for the camera, electric motor 15 is controlled by power source 44, electromagnetic coil 49, starting switch 11 and switches 12, 13, 14 and 36. Switches 12 and 13 are electromagnetic switches operated according to the magnetization of electromagnetic coil 49. Switch 14 is a manipulated switch for switching from one-frame photography to continuous photography and vice versa, in the electrically driven mode of photography. Namely, in one-frame photography, contact 14a is disconnected from contact 14b by a manipulated element not shown, and in continuous photography, contact 14a is connected to contact 14b by the aforesaid element. Switch 36 is actuated by second switch actuating lever 30 to be described later.

Gear 16 is attached to shaft 15a of the electric motor 15, and is meshed with gear 18a attached to one end of shaft 18 journaled in bearing 17 and meshed with gear 19 by gear 18b connected on the other end of shaft 18. Gear 19 and sun gear 20 integral therewith are idly mounted on shaft 23, on one end of which bevel gear 28 is mounted and meshed with another bevel gear 27 attached on film winding shaft 26. Bracket 25 is rigidly mounted on shaft 23 and has supporting shaft 25a projecting therefrom, on which planetary gear 21 is journaled. Planetary gear 21 is meshed with sun gear 20 and internal gear 22 formed on an inner periphery of cylinder 24. The aforementioned gears constitute a differential gear mechanism.

Cylinder 24 is supported by bearing 17 through ball bearings 17a so as to be slightly rotatable and includes bottom plate 24b which has an aperture through which shaft 23 extends. Disposed on the left end of bottom plate 24b is cam 29 consisting of built-up cam face 29a and lowered cam face 29b. Displacement of cam 29 according to the rotation of cylinder 24 causes, through first contacting element 30a, the rotation of second switch actuating lever 30 about shaft 40. Cylinder 24 has a body portion formed with projection 24a to engage truncated end 33b–1 of plate cam 33b mounted on switching shaft 37 (FIGS. 8A–8D).

Switching shaft 37 for mounting plate cam 33b is supported by bearing 17 and fixed supporting frame 39, and includes notched disc 33a engageable with second contacting element 30b of second switch actuating lever 30 and disc 33c engaging one arm 34b of release lever 34. Switching shaft 37 has spring 32 wound therearound and one end fastened through aperture 37a and the other end held rigid by projection 17b of bearing 17. Thus, switching shaft 37 rotates in a counterclockwise direction as seen from the left side of the shaft and is forced leftwardly with respect to the axial direction in FIG. 1.

Second switch actuating lever 30 is provided with first contacting element 30a contacting cam 29 of cylinder 24, second contacting element 30b engageable with notched disc 33a of switching shaft 37, and third contacting element 30c for operating switch 36, and is energized by spring 31 to rotate in the clockwise direction around shaft 40. With the rotation of cylinder 24, first contacting element 30a is shifted from built-up cam face 29a into contact with lowered cam face 29b, thereby causing second switch actuating lever 30 to rotate in the clockwise direction, whereby second contacting element 30b urges notched disc 33a rightwardly against the action of spring 32. To cause that operation spring 31 has a larger force than spring 32. The rightward movement of switching lever 37 causes release lever 34 to rotate counterclockwise around shaft 38 against the action of spring 35, thereby forcing release lever 8 downwardly.

Furthermore, with the rotation of cylinder 24 by electric motor 15, projection 24a, as shown in FIG. 8, urges truncated end 33b–1 of plate cam 33b to rotate switching shaft 37 against the force of spring 32. When notched portion 33a' becomes engaged with second contacting element 30b, switching lever 37 is urged leftwardly by the force of spring 32. The leftward movement of switching lever 37 urges release member 8 upwardly into the initial position.

Because of the continued rotation of cylinder 24, when first contacting element 30a is located at the boundary between built-up portion 29a and lowered portion 29b of cam 29, the contacting resistance becomes larger than the film winding resistance, and accordingly, even if electric motor 15 is driven, the rotation of cylinder 24 is interrupted. Consequently, planetary gear 21 revolves around sun gear 20 to cause the rotation of shaft 23, whereby the film is wound by bevel gears 28 and 27.

Upon termination of the film winding, the film winding resistance becomes larger than the contacting resistance between first contacting element 30a and the boundary area separating built-up portion 29a from lowered portion 29b, whereby the rotation of shaft 23 is interrupted. In turn, cylinder 24 is rotated to urge first contacting element 30a until it reaches built-up portion 29a of cam 29. Simultaneously, second switch actuating lever 30 is urged in the counterclockwise direction to connect switch 36 in the position as shown in FIG. 1.

Release member 8, in the manipulated photography mode, is directly urged from above by shutter button 7 by projection 5a, while in the electrically driven photography mode, member 8 is actuated by pin 34a of release lever 34 fitted in lower slot 8b of release member 8. Furthermore, one end 45a of shutter release lever 45 is fitted in upper slot 8a of release member 8, and the engagement of the shutter is released by the operation of the other end 45b of shutter release lever 45 journaled coaxially with switching cam 1.

THE MANIPULATED MODE OF PHOTOGRAPHY

If switching cam 1 is turned so that built-up portion 1a abuts against lateral portion 2a, lever 2 is urged in the counterclockwise direction around shaft 3 against the force of spring 9. Switching lever 5 journaled on the other end 4 of lever 2 is urged by the rotation of lever 2 to locate the projected portion 5a thereof between the lower end of shutter button 7 and the upper end of release member 8 (the position shown in FIG. 2). With the leftward shift of switching lever 5, pin 5b is disengaged from arm 6a of first switch actuating lever 6.

As shown in FIG. 2, shutter button 7 is urged downwardly to directly actuate release member 8 by projected portion 5a, whereby shutter actuating lever 45 is rotated to release the shutter.

In this case, starting switch 11 is left in the opened position, regardless of the actuation of switching lever 5, since switching lever 5 and first switch actuating lever 6 are disengaged.

THE ELECTRICALLY DRIVEN MODE OF PHOTOGRAPHY

In the electrically driven mode of photography, switching cam 1 is turned until lowered portion 1b contacts lever 2. As a result of the movement of cam 1, lever 2 is rotated in the clockwise direction around shaft 3, whereby shaft 4 at the end of lever 2 is shifted rightwardly and projection 5a is retracted from the position between shutter button 7 and release member 8. In the meantime, pin 5b of switching lever 5 engages with arm 6a of first switch actuating lever 6.

With the arrangement as shown in FIG. 1, if shutter button 7 is urged downwardly, switching lever 5 is rotated in the counterclockwise direction around shaft 4 against the force of spring 10 and first switch actuating lever 6 is caused to rotate by pin 5b in the counterclockwise direction around shaft 42 against the force of spring 41. Consequently, movable contact 11a of normally opened starting switch 11 is switched to closed contact 11b.

Figure 3:
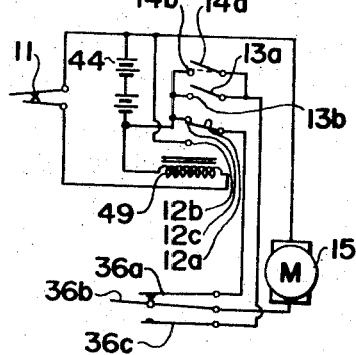
FIG. 3 is a diagram of an electric motor control circuit for the electrically driven camera of this invention wherein a starting switch is in a closed position.

In the electrically driven mode of photography, either one-frame photography or continuous photography is selected. Referring to one-frame photography, when starting switch 11 is closed as manipulated switch 14 is maintained in the opened position, the electric circuit including power source 44 and electromagnet 49 is closed, and switches 12 and 13 are switched, by the magnetization of electromagnet 49, from the position of FIG. 1 to the position of FIG. 3, viz., in switch 12, contact 12a is moved from contact 12b to contact 12c, and in switch 13, contact 13a is moved from contact 13b to an opened position. Consequently, the circuit including power source 44, switches 12, 36a, 36b is closed, thereby driving electric motor 15.

Figure 4:
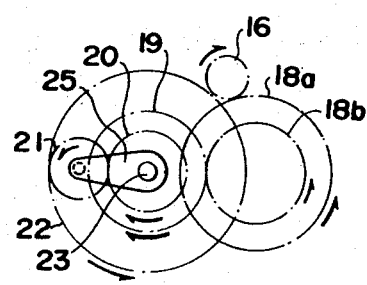
FIG. 4 shows a gear mechanism including a differential gear for the electrically driven camera of this invention.

With the energization of electric motor 15, gear 19 and sun gear 20 integral therewith are rotated in the clockwise direction by gears 16, 18a and 18b, as seen in FIG. 4. At this instant, since the film winding has been terminated, the film winding resistance is large, and therefore the rotation of shaft 23 interconnecting with the film winding shaft 26 has been stopped. Accordingly, by the rotation of sun gear 20, planetary gear 21 rotates around shaft 25a mounted by bracket 25 to move internal gear 22 of cylinder 24 in the counterclockwise direction in FIG. 4. Consequently, first contacting element 30a of second switch actuating lever 30 contacting cam 29 formed on bottom plate 24b of rotating cylinder 24 is shifted from built-up portion 29a to lowered portion 29b of cam 29. Thereby, second switch actuating lever 30 is rotated by the force of spring 31 in the clockwise direction around shaft 40. By this movement, second contacting element 30b of second switch actuating lever 30 moves notched disc 33a rightwardly, thereby switching shaft 37 is forced rightwardly against the force of spring 32. Consequently, disc 33c provided at the end of switching lever 37 rotates release lever 34 in the clockwise direction around shaft 38, thereby causing release lever 8 to descend.

Figure 5:
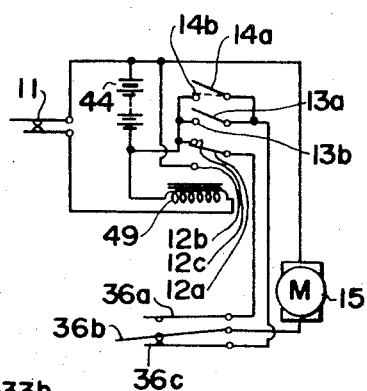
FIG. 5 is a diagram of an electric motor control circuit wherein a switch contact is operated by a switch actuating lever.

Shutter actuating lever 45 is rotated in the counterclockwise direction to release the shutter. Simultaneously with the above movement, during the clockwise rotation of second switch actuating lever 30, central movable contact 36b of switch 36 is switched from contact 36a to contact 36c, and then the motor circuit is switched from the position of FIG. 3 to the position of FIG. 5. At this stage, because switch 13 is maintained in the opened position, the current flow to the electric motor is cut off.

Figure 6:
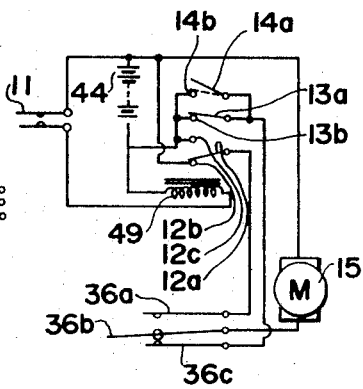
FIG. 6 shows the starting switch of FIG. 5 opened.

After finishing photographing, shutter button 7 is opened and then returned to the initial position by the force of spring 48. With this movement, switching lever 5 and first switch actuating lever 6 are rotated in the clockwise direction by the force of springs 10 and 41, respectively, thereby opening starting switch 11. Accordingly, the electric motor circuit is switched to the condition of FIG. 6 from the condition of FIG. 5. Since the current does not flow to electromagnet 49, contact 12a of switch 12 is switched from contact 12c to contact 12b, and contact 13a of switch 13 is connected to contact 13b. This, the motor circuit as shown in FIG. 6 is completed to drive electric motor 15.

With the energization of electric motor 15, the rotation of cylinder 24 is caused through the gearing system as described. Cam 29 on bottom plate 24b of cylinder 24 is held with its lowered cam face 29b contacting with first contacting element 30a of second switch actuating lever 30, and projection 24a formed on cylinder 24 moves truncated end 33b-1 of plate cam 33b (FIGS. 8B and 8C), whereby switching shaft 37 is forced to rotate in the clockwise direction against the force of spring 32. With the rotation of switching shaft 37, notched disc 33a on switching shaft 37 is rotated as well. When notched portion 33a' of disc 33a becomes registered with second contacting element 30b of second switch actuating lever 30 as shown in FIG. 8C, switching shaft 37 is urged leftwardly by the force of spring 32. At this stage, second switch actuating lever 30 remains as it is and the motor circuit is maintained in the condition as shown in FIG. 6.

In response to the leftward movement of switching shaft 37, release lever 34 is rotated in the clockwise direction by the force of spring 35 to move release member 8 upwardly, thereby returning shutter actuating lever 45 to the initial position.

By the continuous rotation of electric motor 15, the film winding is started as follows. With the rotation of cylinder 24, first contacting element 30a of second switch actuating lever 30 is shifted to the boundary zone between lowered portion 29b and built-up portion 29a of cam 29, and the contacting resistance becomes larger than the film winding resistance which has been reduced as a result of the photographing; hence the rotation of cylinder 24 is stopped. Consequently, planetary gear 21 revolves around sun gear 20 and the rotation of shaft 23 is caused. By the rotation of shaft 23, bevel gear 27 is rotated by bevel gear 28 attached to one end of shaft 23, so as to cause the rotation of film winding shaft 26, thereby effecting film winding.

Upon termination of film winding, the film winding resistance is increased in comparison with the contacting resistance between the boundary separating the lowered portion from the built-up portion and first contacting element 30a of second switch actuating lever 30, and the rotation of shaft 23 is suspended. In turn, cylinder 24 is caused to rotate.

The rotation of cylinder 24 moves first contacting element 30a of second switch actuating lever 30 towards built-up portion 29a from lowered portion 29b of cam 29, and second switch actuating lever 30 is moved in the counterclockwise direction against the force of spring 31, whereupon central movable contact 36b of switch 36 is connected to contact 36a by third contacting element 30c.

Figure 7:
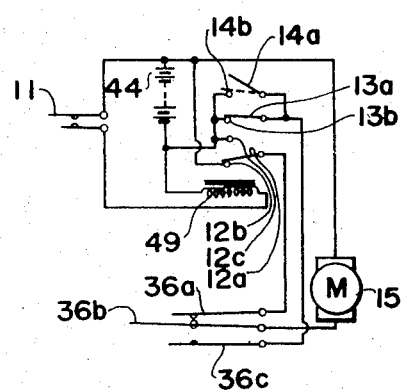
FIG. 7 shows a circuit wherein, upon finishing one frame of photography, the motor is connected to the other contact by the switch actuating lever whereby braking is applied to the electric motor.

Consequently, the motor circuit is as shown in FIG. 7, and electric motor 15 is short-circuited to constitute a brake circuit, whereby the rotation of electric motor 15 is abruptly stopped.

Concurrently with the above movement, the counterclockwise rotation of second switch actuating lever 30 causes the disengagement of second contacting element 30b from notched portion 33a' of notched disc 33a, and switching shaft 37 is returned by the force of spring 32 to the initial position of rotation, and then to the position shown in FIG. 8A, and further into the initial position as shown in FIG. 1. Thus, the electrically driven one-frame mode of photography is completed.

For continuous photography, contact 14a of switch 14 is connected to contact 14b. Accordingly, as seen from FIGS. 3 and 5, during the period that shutter button 7 has been urged downwardly, namely, after starting switch 11 has been closed, the motor circuit remains closed through power source 44, switch 14, switch 36 connected between contacts 36b and 36c and electric motor 15 to allow the continuous rotation of the electric motor 15, despite the change of the connection of switch 36 from the condition of FIG. 3 to the condition of FIG. 7. Accordingly, for every photographic frame, switch 36 is repetitively switched between the condition of FIG. 5 and the condition of FIG. 7, and thus continuous photographing is effected. The operations of the respective elements are entirely the same as for one-frame photography.

FIGS. 9, 10, 11A, 11B, 12A and 12B show other embodiments of a device for switching between electrically driven photography and manipulated photography by actuating a single shutter button, respectively.

In FIG. 9, shutter button 7 is rotatable to either a manipulated photography position as shown by the solid line or an electrically driven photography position as shown by the dotted line. In manipulated photography, if shutter button 7 is placed at the position shown by the solid line and pushed downwardly, shutter button actuating member 7a pushes central movable contact 46b of switch 46 downwardly to connect contact 46b to contact 46a. Consequently, the manipulated release circuit including power source 51 and electromagnet 52 is closed and electromagnet 52 actuates release member 8 to operate the shutter.

In electrically driven photography, shutter button 7 is rotated by 180° to position actuating member 7a as shown by the dotted line, and then shutter button 7 is urged downwardly, whereupon starting switch 11 is closed to operate the motor circuit similar to FIG. 1; thus the shutter clocking and film winding are effected. In this case, switch actuating member 56 serves as the release lever 34 of FIG. 1. With reference to FIG. 1, by the rightward movement of switching shaft 37, release lever 34 is actuated to urge release member 8 downwardly, while in this embodiment, with the rightward movement of switch actuating member 56, switch 53 is closed to energize the release circuit including power source 51, electromagnet 52, switch 53 and contacts 46c and 46b of switch 46. By the resultant rotation of electric motor 52, release member 8 is operated, thereby cocking the shutter.

In the embodiment shown in FIG. 10, actuating portion 7a of shutter button 7 is partly broken away to form a stepped or integral portion and an elongated portion. In manipulated photography, the elongated portion of actuating portion 7a faces release member 8 as shown by the solid line. By urging shutter button 7 downwardly, release member 8 is directly operated. In electrically driven photography, shutter button 7 is rotated so as to confront the elongated portion of actuating portion 7a with first switch actuating lever 6, and then pushed downwardly. Then, only first switch actuating lever 6 is rotated in the counterclockwise direction to close starting switch 11, and the shutter is operated through the steps similar to those in the electrically driven photography of FIG. 1, thereby winding the film.

Figure 11A:
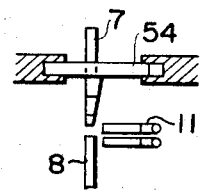
Figure 11B:
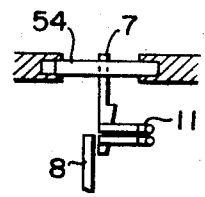

In the embodiment of FIGS. 11A and 11B, horizontally slidable shutter button seat 54 is provided as a support member for the shutter button. In manipulated photography, shutter button seat 54 is shifted leftwardly to align shutter button 7 with release member 8. In electrically driven photography, shutter button seat 54 is shifted rightwardly to align shutter button 7 with starting switch 11.

Figure 12A:
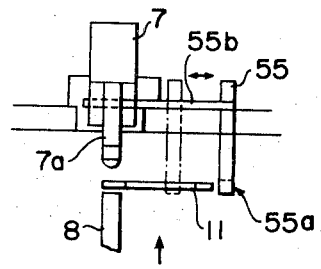
Figure 12B:
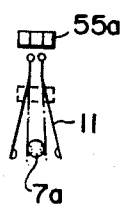

In the embodiment of FIGS. 12A and 12B, there is provided slide plate 55 having member 55b for limiting the downward shift of shutter button 7 and member 55a forming a spacing between the contacts of starting switch 11. Slide plate 55 is shifted so as to switch between manipulated photography and electrically driven photography positions. In manipulated photography, if slide plate 55 is shifted to the position shown by the solid line, member 55b remains out of the path of shutter button 7 and member 55a is spaced from starting switch 11 so as to leave a relatively large spacing between the contacts. By pressing shutter button 7 downwardly, release member 8 is urged downwardly to actuate the shutter. In electrically driven photography, if slide plate 55 is shifted leftwardly into the position shown by the dotted line, member 55b enters the path of shutter button 7 so as to control the downward stroke of shutter button 7. Member 55a functions to reduce the spacing between the contacts of starting switch 11. Accordingly, if shutter button 7 is pushed, shutter button actuating portion 7a stops at the position contacting with starting switch 11 having a reduced spacing between its contacts at this stage and thereby starting switch 11 is closed. Thereafter, the steps similar to those in electrically driven photography in FIG. 1 take place.

What is claimed is:

1. A mechanism for controlling an electrically driven camera having an electric motor, a release member operated by rotation of the electric motor, and a film winding means driven by the electric motor with the operation of the release member after the completion of an exposure, comprising:
   a release button;
   a first switch connecting said electric motor to a power source;
   a switching means for selectively connecting said release button with said first switch and said release button with said release member, said switching means comprising:

a selection member displaceable between a first position and a second position;

means for connecting said release button to said release member when said selection member is at said first position; and a first switch actuating member closing said first switch by releasing said release button when said selection member is in said second position.

2. A mechanism as in claim 1, wherein said switching means further comprises:

a shaft rotatable between a first position and a second position;

a cam plate mounted to said shaft;

a connecting lever operated by said cam plate and urged to a position for connecting said release button with said release member with said shaft in said second position; and first switch actuating lever operated by said cam plate and closing said first switch in association with the release movement of said release button with said shaft in said second position.

3. A mechanism as in claim 1, wherein said switching means further comprises:

a lock member for arresting the release of said release button to disconnect said release button and said release member.

4. A mechanism for controlling an electrically driven camera having an electric motor, a release member operated by rotation of the electric motor, and a film winding means driven by the electric motor with the operation of the release member after the completion of an exposure, comprising:

a release button;

a first switch connecting said electric motor to a power source;

a switching means for selectively connecting said release button with said first switch and said release button with said release member;

a differential gear driven by said electric motor to produce first and second outputs, said differential gear generating said first and second outputs depending upon the variation of a load applied to both said outputs;

a film winding mechanism operated by said first output; and a cam driven by said second output for actuating said release member.

5. A mechanism as in claim 4, further comprising:

an electromagnet connected to said power source when said first switch is closed;

a second switch operated by said electromagnet and connecting said power source to said electric motor;

a third switch operated by said electromagnet and switching between a circuit for short-circuiting said electric motor and a circuit connected in parallel with said second switch and connecting said electric motor to said power source;

a second switch actuating lever operated in association with said cam;

a second switching means for connecting or disconnecting a fourth switch connected in series with said third switch and operated by said second switch lever and a fifth switch connected to said second switch and operated by said second switch lever; and a sixth switch connected in parallel with said second switch and manipulated to switch between one-frame photography and continuous photography.

6. A mechanism for controlling an electrically driven camera having an electric motor, a release member operated by rotation of the electric motor, and a film winding means driven by the electric motor with the operation of the release member after the completion of an exposure, comprising:

a release button axially movable for the release operation and displaceable in another direction between a first position and a second position;

a first switch connecting an electric motor with a power source; and a means for directing the axial directional displacement of said release button to said release member when said release button is in said first position and for directing the axial displacement of said release button to the opening or closing of said first switch when said release button is in said second position.

7. A mechanism as in claim 6, wherein said release button is rotatable in said another direction about the axial movement thereof between said first position and said second position.

8. A mechanism as in claim 6, wherein said release button is slidable between said first position and said second position in a direction normal to the axial directional movement thereof.

* * * * *